(12) United States Patent
Chen et al.

(10) Patent No.: US 8,891,625 B2
(45) Date of Patent: Nov. 18, 2014

(54) STABILIZATION METHOD FOR VIBRATING VIDEO FRAMES

(75) Inventors: Chao-Ho Chen, Tai-Nan (TW); Jie-Ru Chen, Taipei County (TW); Sheng-Hong Wang, Changhua County (TW); Cheng-Chieh Liu, Tainan County (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 455 days.

(21) Appl. No.: 12/793,711

(22) Filed: Jun. 4, 2010

(65) Prior Publication Data

US 2011/0134329 A1 Jun. 9, 2011

(30) Foreign Application Priority Data

Dec. 4, 2009 (TW) .............................. 098141504 A (51) Int. Cl.
*H04N 5/14* (2006.01)
*G06T 7/20* (2006.01)
*G06T 5/50* (2006.01)
*H04N 5/232* (2006.01)

(52) U.S. Cl.
CPC ................ *G06T 7/2013* (2013.01); *G06T 5/50* (2013.01); *H04N 5/145* (2013.01); *H04N 5/23254* (2013.01); *H04N 5/23267* (2013.01); *G06T 2207/10016* (2013.01); *G06T 2207/20021* (2013.01); *G06T 2207/20201* (2013.01)
USPC .................................................. 375/240.16

(58) Field of Classification Search
CPC .................... H04N 5/23248; H04N 19/00593; H04N 5/23264; H04N 7/26771; H04N 5/145; H04N 5/23254; H04N 5/23267; G06T 5/002; G06T 2207/10016; G06T 2207/20021; G06T 2207/20201; G06T 5/003; G06T 5/50; G06T 7/2013
USPC ...................................................... 375/240.16
See application file for complete search history.

(56) References Cited

U.S. PATENT DOCUMENTS

| 5,053,876 A * | 10/1991 | Blissett et al. ........... 348/208.14 |
| 2005/0094849 A1 * | 5/2005 | Sung et al. ..................... 382/103 |
| 2007/0223808 A1 * | 9/2007 | Kerr .............................. 382/159 |
| 2008/0107186 A1 * | 5/2008 | Brusnitsyn et al. ...... 375/240.28 |

FOREIGN PATENT DOCUMENTS

WO   WO 2004054223 A1 *   6/2004   ............ H04M 11/04

OTHER PUBLICATIONS

"Video Stabilization by Feature-Block Motion Estimation," Intelligent Systems Design and Applications, 2008. ISDA '08. Eighth International Conference on, vol. 3, No., pp. 557-560, Nov. 26-28, 2008 to Chao-Ho Chen et al.*

"Camera-Shake Detection and Evaluation of Image Stabilizers" SICE Annual Conference 2008, Aug. 20-22, by Ogino et al.*

(Continued)

*Primary Examiner* — Mehrdad Dastouri
*Assistant Examiner* — Mohammed Rahaman
(74) *Attorney, Agent, or Firm* — Winston Hsu; Scott Margo (57) ABSTRACT

A method of performing video stabilization may be applied to unstable frames captured by a vibrating camera. The method includes checking if the frame is vibrating and calculating a degree of vibration for compensating a vibration area. Based on block motion estimation, a feature block selected from nine fixed observation blocks is used to obtain a vibration vector. The vibration vector is used to adjust the vibration frame for restoring the frame.

19 Claims, 4 Drawing Sheets

(56) References Cited

OTHER PUBLICATIONS

Digital Image Stabilization Based on Statistical Selection of Feasible Regions, Lee et al., IEEE Transactions on Consumer Electronics, vol. 55, No. 4, Nov. 2009.*

Digital Image Stabilization with Sub-Image Phase Correlation Based Global Motion Estimation, S. Ertürk, Member, IEEE Transactions on Consumer Electronics, vol. 49, No. 4, Nov. 2003.*

Duric, "Stabilization of image sequences", University of Maryland, Tech. Rep. CAR-TR-778, Jul. 1995.

Hansen, "Real-time scene stabilization and mosaic construction," in Proc. IEEE Computer Vision and Pattern Recognition Conf., pp. 54-62, 1994.

Horn, "Determining optical flow", Artificial Intelligence, vol. 17, pp. 185-203, 1981.

Lucas, "An iterative image registration technique with an application to stereo vision", Proceedings of Imaging understanding workshop, pp. 121-129, 1981.

Chang, "A robust real-time video stabilization algorithm", Journal of Visual Communication and Image Representation Volume: 17, Issue: 3, June, pp. 659-673, 2006.

Morimoto, "Fast electronic digital image stabilization", Univ. Maryland, Tech. Rep. of CVL, 1996.

Jie-Ru Chen, "The Study on Video Stabilization Based on Motion Compensation", A Thesis Submitted to Institute of Electronic Engineering National Kaohsiung University of Applied Sciences in Partial Fulfillment of the Requirements for the Degree of Master of Engineering in Electronic Engineering, Jun. 2009, Chapter 4, Abstract.

* cited by examiner

STABILIZATION METHOD FOR VIBRATING VIDEO FRAMES

CROSS-REFERENCE TO RELATED APPLICATIONS

This application claims priority to Taiwan Patent Application No. 098141504, filed Dec. 4, 2009, and incorporated herein by reference in its entirety.

BACKGROUND OF THE INVENTION

1. Field of the Invention

The present invention relates to methods for stabilizing vibrating video images, and more particularly to a method for stabilizing vibrating video images utilized in a Digital Video Recorder (DVR).

2. Description of the Prior Art

Development of image and video processing has spanned many years. Image and video processing techniques, including segmentation, tracking, counting, image enhancement, and image registration, are widely adopted in both civilian and military applications. Video is a very important source of information for multimedia applications, however most video processing techniques direct their processing at already captured, stable images, without regard for influence of vibrating images. For example, instability in a picture is very uncomfortable on human vision of a user. Tracking, counting, segmentation and other techniques utilized in video processing are influenced by vibrations, which cause error and/or loss of data, and related algorithms even cause erroneous judgments in later computer vision processing, possibly even leading to a serious crash of the entire image system. Thus, vibrating image removal is very important, and primarily focuses on removing vibrating between consecutive frames, converting an unstable image into an image more stable for human vision.

A Digital Video Recorder System (DVR System) is already widely applied in environmental safety, traffic monitoring, and crime prevention systems. Government agencies, schools, train stations, airports, military installments, roads, and historic sites all employ some form of monitoring recording system. However, digital monitoring recording systems are susceptible to influence by external forces (internal vehicle vibration, vibration from passing vehicles, shaking due to wind, and human vibration), which cause instability in the video image, reducing video data compression ratio, and influencing video recognition processing of the DVR System. Thus, maintaining stability in video images is an important issue for the DVR System.

Digital monitoring recorders may be affect by external force and generate unstable monitoring recording images. In a system, video image instability leads to calculation errors in information, increasing noise, thereby causing video image blurring, video compression ratio reduction, background determination errors, and object removal segmentation failures, which causes erroneous judgment by the computer vision system. If the monitoring recording system is utilized in a critical monitoring application, or a safety monitoring application, e.g. a vehicle monitoring system, a traffic flow monitoring system, a financial monitoring system, disaster detection, risk prevention detection, or a military application, the erroneous judgment may lead to loss of property, or even loss of life.

Not only does maintaining stability in video images aid the digital monitoring recording system, it is also important to many computer vision applications, such as remote image transmission, robot guidance, ego-motion recovery, scene modeling, video compression, and object motion detection. To keep the video image stable, two important factors are considered: frame vibration vector detection, and frame vibration vector correction.

Methods for performing frame vibration vector detection and correction have been proposed. The following are related contributions in the literature:

[1] Z. Duric and A. Rosenfeld, "Stabilization of image sequences", University of Maryland, Tech. Rep. CAR-TR-778, July 1995.

[2] M. Hansen, P. Anadan, K. Dana, G. van de Wal, and P. Burt, "Real-time scene stabilization and mosaic construction," in Proc. IEEE Computer Vision and Pattern Recognition Conf., pp. 54-62, 1994

[3] Horn, B. K. P. and Schunck, B. G., "Determining optical flow", Artificial Intelligence, vol 17, pp 185-203, 1981.

[4] Lucas B D and Kanade T, "An iterative image registration technique with an application to stereo vision", Proceedings of Imaging understanding workshop, pp 121-129, 1981.

[5] Huang-Chang Chang, Shang-Hong Lai, Kuang-Rong Lu, "A robust real-time video stabilization algorithm", Journal of Visual Communication and Image Representation Volume: 17, Issue: 3, June, pp. 659-673, 2006.

[6] C. Morimoto and R. Chellappa, "Fast electronic digital image stabilization", Univ. Maryland, Tech. Rep. of CVL, 1996.

Detection of frame vibration vector in an image primarily depends on which vibration model is chosen, and which vibration mode is utilized to calculate the frame vibration vector. Reference [1] utilizes the human eye's greater sensitivity to rotational vibration, and requires no extra information, to compensate for vibration. Reference [2] estimates the frame vibration vector, and defines an Affine Model, however when the frame vibration vector is too large, the method generates a very large error. References [1] and [3] utilize a singular line (defined as an infinite straight line passing through two singularity points) to detect the frame vibration vector, based on the theory that the singular line is not affected by slight rotation of the image, and assuming that singular lines for outdoor scenes have large gradient variation. However, validity of this assumption is limited in that the singular line must be longer than average length of the image. Thus, three possible conditions may occur that increase likelihood of error: the singular line is unclear, blurriness makes it impossible to determine, or the singular line obtained has length shorter than average length of the image.

Frame vibration vector correction keeps necessary pixels of a vibrating image, and removes unnecessary information of the vibrating image. First, a reference image is acquired, and following images and reference images are sequenced. Then, relative reference points of the images are compared to obtain a frame vibration vector between the images. An image restored based on the frame vibration vector is a stable image. The method is applicable when the frame vibration vector is not large, and the scene sampled by a lens must be fixed. Thus, when the vibration model corresponds to repeated, intense vibration or translational vibration, because internal calculation variables accumulate, exceeding real frame vibration vectors by too much, an erroneous result is generated. Reference [1], in study of image vibration caused by translational sampling, assumes a videographer intentionally makes a smooth motion, so that a stable image may be obtained by adjusting a vibration curve in each time interval.

The result is stable for consecutive images in each time interval. However, motion speed of each following point varies greatly for each time interval. Thus, in order to make video frames appear smooth, the method must insert a delay of a few image frames between each time interval. Reference [3] proposes a moving camera motion model. This model separates frame vibration vector of an image background and frame vibration vector of a moving object. The method is very effective for a known camera videographer motion variable, and a very stable camera setup. If the camera is installed on a moving object, such as a vehicle or aircraft, for filming, motion variables include: rate of motion of the moving object, moving object suspension system characteristic variables, relative distance between foreground and background, and environmental gravity. Thus, in practical situations, references [1], [2], and [3] have a large margin for improvement.

References [3] and [4] provide an optical flow for obtaining a motion vector of a characteristic object. Reference [3] utilizes a relationship between spatial and temporal domains of video, using iterative recursion to obtain a motion vector of a characteristic object. Reference [4] segments original video into smaller regions, and assumes that each smaller region has its own motion vector, using weighted least-square fitting to obtain optical flow value. For a fixed camera over an extremely short period of time, the optical flow value obtained through the optical flow method is the motion vector. However, the optical flow method has the following weaknesses: (1) It is not suitable for vibrations in an optical zoom environment; (2) A light source changes during dynamic filming; (3) Calculations take too long, and cannot be applied real-time. Although reference [5] proposes a homogenous region to reduce number of calculations, the method is still too slow for real-time systems.

Because video image stabilization is a pre-processing function among all digital monitoring recording system functions, eliminating video image vibration in real-time is a basic requirement. Research on real-time processing of video vibration is being performed in various fields, including military applications, communications organizations, and even image stabilization for handheld camcorders sold in the marketplace. Reference [2] realizes a system capable of stabilizing video images called a parallel pyramid system (VFE-100), which estimates consecutive vibration variables through a multi-resolution method of gradual approximation. The method primarily utilizes error of moving object momentum corresponding to a set affine motion model to derive a motion variable. If a video image requires compensation, a stored, verified input image is used to compensate the vibrating image, so as to output a stable result. The system is capable of processing at 10 frames/sec (fps) for 128×128 pixel images having a frame vibration vector within ±32 pixels. Reference [6] utilizes the same method to realize a Datacube Max Video 200, also called a PIPE (parallel pipeline image processing machine). An experimental sample thereof utilizes 128×120 pixel images, and achieves an experimental result of 10.5 fps, allowing the method to achieve a stabilization effect for video images having a frame vibration vector within ±35 pixels.

The above methods fail to provide an effective stabilization method that can be applied to real-time video stabilization processing.

SUMMARY OF THE INVENTION

According to an embodiment, a method of real-time stabilizing a vibrating image comprises positioning nine fixed observation blocks (FOB) of an input video image, selecting one fixed observation block of the nine fixed observation blocks as a feature block (FB), utilizing block matching to find a motion vector of the feature block, utilizing the motion vector to restore an offset of the input video image caused by vibration, and displaying the restored input video image on a display. When selecting the one fixed observation block of the nine fixed observation blocks as the feature block for calculating the motion vector, the remaining eight blocks of the nine fixed observation blocks continue to be updated by later input video images, and if a moving object entering the feature block is detected, a second fixed observation block of the remaining eight blocks is selected as a new feature block.

According to another embodiment, a method of real-time stabilizing a vibrating frame comprises utilizing frame differencing to difference N pixel values at N corresponding same positions in two neighboring frames to obtain N differences, comparing each difference of the N differences to a first threshold to obtain a number of differences greater than the first threshold, determining the two neighboring frames as having vibration when the number of differences greater than the first threshold is greater than a second threshold, positioning nine fixed observation blocks of an input video frame when the two neighboring frames are determined to have vibration, selecting one fixed observation block of the nine fixed observation blocks as a feature block, utilizing block matching to find a motion vector of the feature block, utilizing the motion vector to restore offset of the input video frame caused by vibration to generate a restored video frame, and outputting the restored video frame to a display. When the feature block of the nine fixed observation blocks is selected for calculating the motion vector, the eight remaining fixed observation blocks of the nine fixed observation blocks continue to be updated according to inputted video frames, and one fixed observation block of the eight remaining fixed observation blocks is selected as a new feature block when encroachment of a moving object on the feature block is detected.

According to another embodiment, a method of real-time stabilizing a vibrating frame comprises applying frame differencing on each two neighboring frames of M consecutive frames to obtain M−1 first numbers, determining the M consecutive frames have vibration when number of the M−1 first numbers greater than a second threshold is greater than (M−1)*0.8, positioning nine fixed observation blocks of an input video frame when the M consecutive frames have vibration, selecting one fixed observation block of the nine fixed observation blocks as a feature block, utilizing block matching to find a motion vector of the feature block, utilizing the motion vector to restore an offset of the input video frame caused by vibration to generate a restored video frame, and outputting the restored video frame to a display. When the feature block of the nine fixed observation blocks is selected for calculating the motion vector, the eight remaining fixed observation blocks of the nine fixed observation blocks continue to be updated according to inputted video frames, and one fixed observation block of the eight remaining fixed observation blocks is selected as a new feature block when encroachment of a moving object on the feature block is detected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
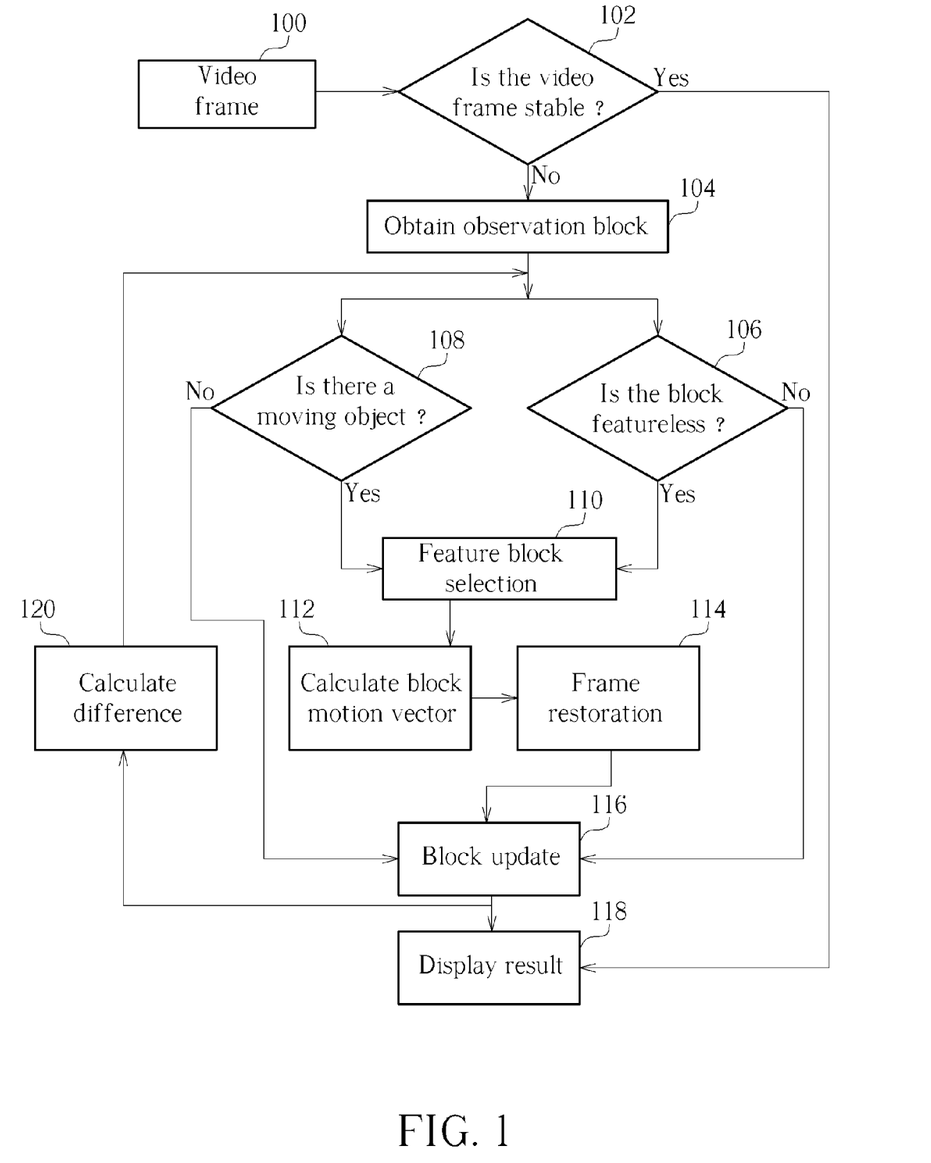
FIG. 1 is a flowchart of a method of real-time stabilizing vibrating images according to an embodiment.

Please refer to FIG. 1, which is a flowchart of a method of real-time stabilizing vibrating images according to an embodiment. The method may be directed to restoring a video image affected by vibration. Region variations and information obtained from one image frame to a next image frame may be used to select a feature block for calculating a frame vibration vector for restoring an image. The method requires a low number of calculations, and is suitable for real-time processing. The following is a description of major function blocks of the flowchart of FIG. 1.

1. Image Vibration Detection

In image vibration detection, frame differencing is performed on neighboring frames, then determination is made on whether the image is stable based on a pixel number ratio of a difference image formed by the frame differencing. For a stable image, the difference image has a relatively large number of low pixel values. For a vibrating image, the difference image has a relatively large number of high pixel values. Thus, the method uses this relationship to detect vibration in the image. If the video image is stable, the video image is outputted directly. If the video image has vibration, image stabilization correction is performed prior to outputting the video image.

Given two neighboring frames $f_t(x,y)$ and $f_{t-1}(x,y)$ at different times, where $(x,y)$ represents coordinates and t is a time variable, $f_t(x,y)$ and $f_{t-1}(x,y)$ represent pixel values of a pixel at $(x,y)$ at times t and t−1, respectively, and a difference $d_t(x,y)$ between the two neighboring frames can be defined as:

$$d_t(x,y)=|f_t(x,y)-f_{t-1}(x,y)|. \quad (1)$$

Defining a first threshold Th1, LN represents number of pixels in the difference image $d_t(x,y)$ having value greater than the first threshold Th1. Defining a second threshold Th2, if LN is greater than the second threshold Th2, the two neighboring frames are affected by vibration. However, in a sequence of frames, in some cases, when vibration speed is changing back and forth from fast to slow, or for other reasons, LN between two neighboring frames may not be greater than the second threshold Th2. Thus, in order to increase accuracy of detecting image vibration, the method determines whether LN is greater than the second threshold Th2 for over 80% of consecutive frames in the sequence of frames, so as to determine that the image is affected by vibration, which is shown in condition (2) below:

$$\text{IF NUM}_{(LN > Th2)} > TN * 80\% \quad (2)$$
VIBRATING
ELSE    STABLE where $\text{NUM}_{(LN>Th2)}$ is number of times LN is greater than the second threshold Th2, and TN is a total number of determinations.

2. Searching for Features

The method first selects a qualified feature block from nine observation blocks, then calculates a frame vibration vector (including vibration magnitude and direction) of the feature block by performing block matching approach. In this way, the method obtains a block frame vibration vector, which acts as an overall image frame vibration vector for use in later image adjustment and restoration processing.

2.1 Fixed Observation Blocks

Figure 2:
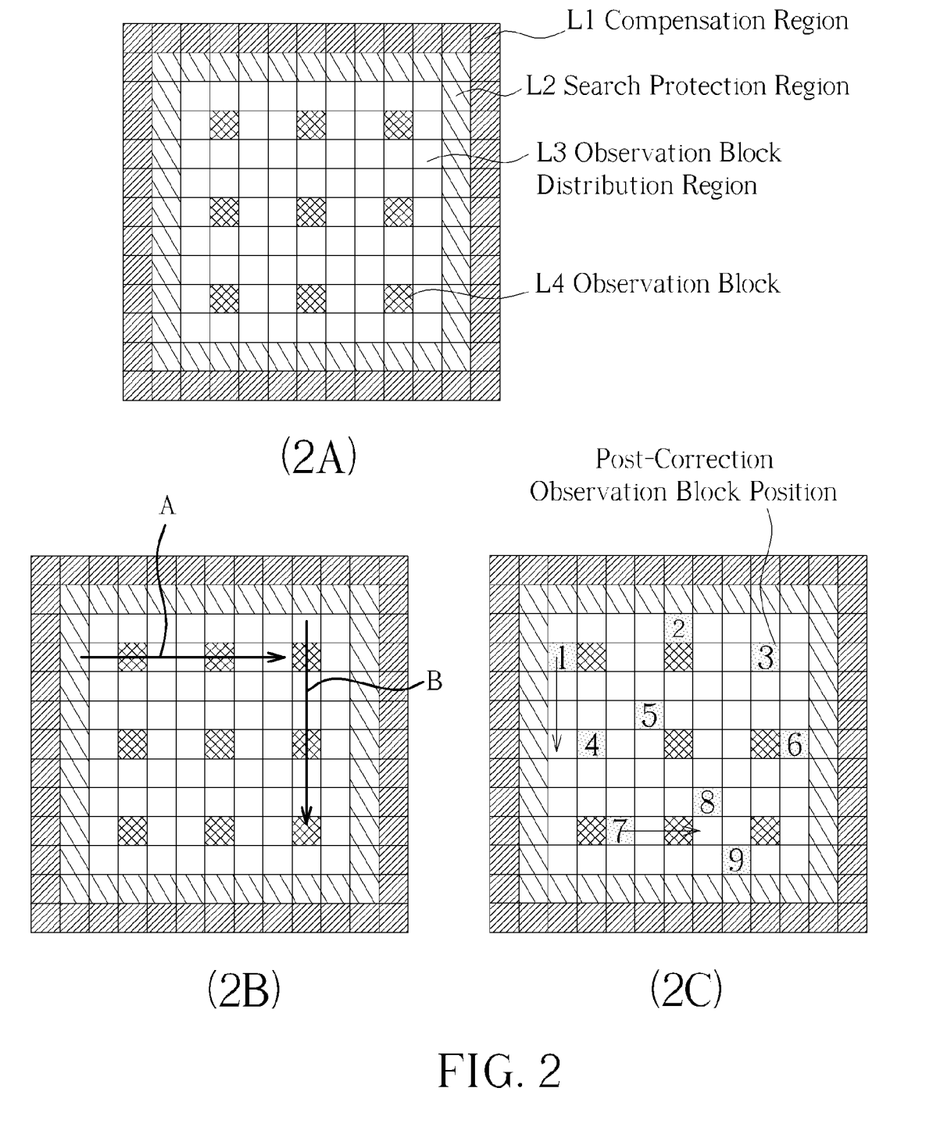
FIG. 2A is a diagram illustrating a compensation region, a search protection region, and observation blocks.
FIG. 2B is a diagram illustrating motion direction of a moving object.
FIG. 2C is a diagram illustrating repositioning of the observation blocks of FIG. 2A into new observation block positions.

A "fixed observation block" refers to an observation block having a fixed position. The method sets nine fixed observation blocks, each having dimensions of 20×20 pixels. As for positioning of the observation blocks in an image, each image is divided up with 20×20 pixel blocks as a unit. An outermost 20 pixels wide (1 unit wide) on the top, bottom, left, and right borders of 4 sides of the image acts as a compensation region. A second border 20 pixels (1 unit) inward from the outermost border acts as a search protection region (a second outermost border). The outermost border and the second border prevent overly large movement from causing the method to be unable to find a similar block, thereby obtaining an erroneous block motion vector (or frame vibration vector). Nine observation blocks are evenly distributed throughout a remaining, central region of the image. As shown in FIG. 2A, L1 is a compensation region, L2 is a search protection region, and L3 is an observation block distribution region. Regions marked by crisscross are fixed observation blocks. Horizontal or vertical motion of an object may cause continuous encroachment, whereby too many observation blocks are covered, and motion vector derivation is affected. As shown in FIG. 2B, arrow A represents motion direction of a horizontally-moving object, and arrow B represents motion direction of a vertically-moving object. In order to prevent the above problem, the observation blocks are distributed according to the following principle: "No observation block may be distributed in a horizontal or vertical line with its top, bottom, left, or right neighboring observation block", so as to reduce probability of repeated encroachments by a moving object (s). As shown in FIG. 2C, regions marked by crisscross represent positions of observation blocks before correction, and regions marked by numerals (1, 2, . . . , 9) represent positions of observation blocks after correction. For example, prior to correction, an observation block 1 has neighboring observation blocks 2 and 4. After correction, the observation block 1 is not distributed in a line horizontally or vertically with either the observation block 2 or the observation block 4. Prior to correction, an observation block 5 has neighboring observation blocks 2, 4, 6 and 8. After correction, the observation block 5 is not distributed in a line horizontally or vertically with any of the observation blocks 2, 4, 6, or 8. A vertical arrow shown in FIG. 2C represents motion direction of a moving object. After correction, vertical encroachment on the observation block 1 by the moving object will not immediately affect the observation block 4. Likewise, horizontal encroachment on observation block 7 will not immediately affect the observation block 8.

2.2 Feature Blocks

In selection of a feature block, if an inappropriate feature block is selected, an erroneous motion vector may be obtained, which will cause image restoration errors, and greater instability. Thus, unqualified blocks may be removed. Two main types of unqualified blocks are described in the following.

(1) Featureless Blocks:

Featureless blocks typically have similar color throughout the entire block, and frequently occur in road or sky scenes. Blocks in these scenes have pixels that are almost all within a similar numeric range, and have little or no color variation. It is easy to find similar blocks to this type of block in a search area, which leads to an incorrect calculation of the motion vector.

(2) Blocks Containing Moving Objects:

Video image content is primarily split into background and foreground (moving object) content. When the image vibrates, as far as a block comprising a moving object is concerned, in addition to overall motion vector of the image, the block also comprises a motion vector of the moving object. Thus, in feature block selection, in addition to avoiding featureless blocks, selection of blocks containing moving objects may also be avoided. Otherwise, a block that may change at any time may be obtained due to motion of the moving object, leading to incorrect calculation of the motion vector.

As can be seen from the above, two types of blocks increase the likelihood of calculating an erroneous motion vector: featureless blocks and blocks with moving objects. Thus, the method utilizes the following selection methodology for removing these two types of blocks to increase the chance of selecting a valid feature block.

(1) Featureless Block Filtering:

Regarding featureless blocks, the method utilizes gray level histogram analysis to remove featureless blocks. First, pixel value range of pixels within the block (originally 0-255) is normalized to a range of 0 to 25 (26 levels total). Number of pixels in each level is calculated, and if one level has a number of pixels greater than half the total number of pixels in the block (20×20=400), the block is filtered out as a featureless block.

(2) Filtering of Blocks Containing Moving Objects:

Differences between two observation blocks at a same position in neighboring frames are typically small. If a moving object encroaches upon the observation block, the difference will become large. In normal video content, block content of consecutive frames changes with each frame. Thus, a current observation block (pre-updated) and an updated observation block may be utilized for processing. The processing is equivalent to finding a difference between two observation blocks at a same position in neighboring frames of a stable video image. So, when a moving object encroaches, the difference exhibits a dramatic change. Thus, equation (3) below is utilized to calculate an average difference $Diff_{AVG}$ between the two observation blocks (pre- and post-updated), and the average difference is utilized to determine whether a moving object encroaches on the observation block. Equation (3) is given as follows:

$$Diff_{AVG} = \frac{1}{MN} \sum_{m=1}^{M} \sum_{n=1}^{N} |B_i(m, n) - B_{i-1}(m, n)| \quad (3)$$

where MN represents size of the block, $B_i$ represents a post-updated block, and $B_{i-1}$ represents a pre-updated block. The average difference $Diff_{AVG}$ being greater than a difference threshold Th1 represents a moving object encroaches on the block. The average difference $Diff_{AVG}$ being less than the difference threshold Th1 represents no moving object encroaches on the block.

2.3 Feature Block Selection

The method described above may be utilized to remove any of the nine observation blocks that is a featureless block and/or a block encroached on by a moving object. Then, from the remaining, qualified blocks, the level described in section 2.2 above may be utilized to select a highest matching (highest priority) observation block as a feature block for searching for a motion vector.

During filtering, any featureless blocks are directly removed. For qualified blocks, if number of pixels at each level in a block are roughly evenly distributed, with no level having a particularly high number of pixels, this represents that texture variation of the block is relatively high, making the block a more suitable feature block candidate. If any level of any block has a number of pixels approaching half of total number of pixels of the block, and other levels of the block have lower numbers of pixels concentrated around the level having the high number of pixels, this represents that texture of the block is relatively bland, which is relatively more likely to cause an error when performing matching while searching for a motion vector in a later process, making the block less appropriate for selection as a feature block. Thus, the feature block of the method is selected with priority defined as: higher priority is given to observation blocks having lower highest pixel count of the highest pixel number.

In light of the above, after removing unqualified observation blocks and arranging priority of qualified observation blocks, determination is made among qualified observation blocks having highest priority whether or each qualified observation block comprises a moving object according to the difference value $Diff_{AVG}$ described in section 2.2 above. If a qualified observation block comprises a moving object, the qualified observation block is removed, and a next highest priority observation block is processed.

However, if number of moving objects in the frame is too high, such that all nine observation blocks each comprise a moving object, in order to prevent causing a stable original image from being erroneously determined to be an unstable image, the method outputs the original image.

3. Vibration Vector Calculation

For a feature region selected by the method described in section 2.3, block matching is used to find a motion vector (or frame vibration vector) of the feature region, which is utilized as a frame vibration vector for the overall frame for use in later image adjustment and/or restoration processing. Block matching utilizes mean absolute difference (MAD) as a comparison method, which is shown in equation (4):

$$MAD = \frac{1}{M'N'} \sum_{m=1}^{M'} \sum_{n=1}^{N'} |P_{m,n} - P'_{m,n}|, \quad (4)$$

where $P_{m,n}$ represents original pixel value of an m,n$^{th}$ pixel in the block, and $P'_{m,n}$ represents pixel value of the m,n$^{th}$ pixel after motion. A block position in the frame having lowest MAD after block motion is found, and motion vector of the block is defined from original block position to the position after motion of the block.

Figure 3:
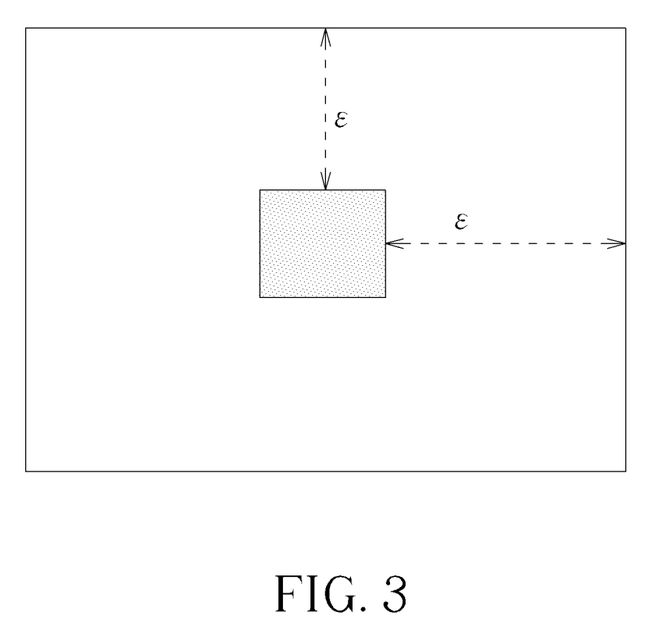
FIG. 3 is a diagram illustrating motion vector scope of a feature block search.

Search for the block position adopts a full search method. As shown in FIG. 3, M'*N' represent size of a search frame, namely size of the original image minus the outermost border L1 (see FIG. 2A). Search area for the motion vector is represented as [±ϵ, ±ϵ], with search from left to right, and from top to bottom. Thus, (X, Y) of the motion vector is calculated according to the original block position and a result position of block matching through the search.

4. Image Restoration

Figure 4:
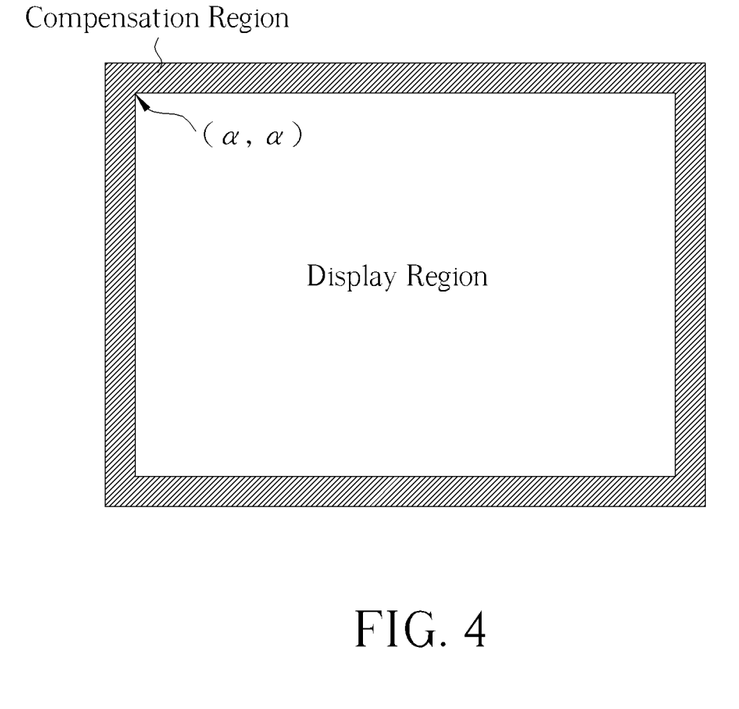
FIG. 4 is a diagram of restoring a video image.

Because the method utilizes top, bottom, left, and right of an original frame to obtain an alpha value α as a compensation region (see FIG. 2A, L1). Thus, during image restoration, coordinates (α, α) of the original frame are taken as a starting point. As shown in FIG. 4, motion vector (X,Y) obtained as described above is utilized for performing image restoration. Equation (5) for a stabilized frame Stable_F(x,y) is given as follows:

$$\text{Stable}\_F(x,y) = \text{Original}\_F(x+\alpha+X, y+\alpha+Y) \quad (5)$$

where Original_F(x, y) represents an original frame, (x, y) represents coordinate values, and (X, Y) represents a motion vector.

5. Block Updating

When one observation block of the nine observation blocks is selected as the feature block for calculating the motion vector of the block in the vibrating image, the remaining eight observation blocks continue to be updated. At this time, if a moving object encroaches on the feature block, the next highest priority observation block is chosen as the new feature block. Because the method utilizes consecutive neighboring frame information processing to separate the observation blocks into featureless blocks and candidate feature blocks and to detect encroachment of a moving object thereupon, content of the observation blocks updated during updating is already-corrected frame content. All nine observation blocks are updated simultaneously. Updated object blocks $OBK_i$ are given in equation (6) as follows:

$$OBK_i(x,y) = OBK_{i-1}(x+X, y+Y) \quad (6)$$

where $OBK_{i-1}$ represents a non-updated block, (x,y) represents coordinates, and (X,Y) represents the motion vector.

One goal of updating the blocks, other than preventing a moving object from causing an error in obtaining a motion vector during calculation of the motion vector of the feature block, is preventing light and shadow variation from causing an error in obtaining the motion vector in the feature block. Thus, the feature block is constantly monitored to determine whether or not the feature block is in a qualified range. If the feature block is qualified, the feature block continues to be used. If the feature block is disqualified, the feature block is replaced.

Embodiments described above provide a method of stabilizing vibrating video images effectively and in real time. The method primarily comprises steps of: determining whether an image is a vibrating image, finding a feature region, calculating a frame vibration vector of the image, and performing image restoration. The method primarily adopts fixed video capture, using relationships between consecutive video images. First, detection of vibration in regions is performed. Then, vibration magnitude is calculated to restore the image and achieve a stable image. During detection of vibration in the regions, if the image is a vibrating image, one observation block of nine observation blocks is chosen as a feature block for comparison for obtaining the motion vector. The motion vector is utilized for correcting offset of the image caused by vibration to achieve the image restoration function.

The embodiments described provide a method of restoring vibrating images caused by video camera vibration in real time that can be applied to a video camera to solve the problem of video monitoring images vibrating due to camera vibrations. For example, for monitoring systems installed outdoors or for vehicle monitoring systems, the embodiments enhance monitoring image quality, benefiting later image compression and computer vision processing analysis.

Those skilled in the art will readily observe that numerous modifications and alterations of the device and method may be made while retaining the teachings of the invention.

What is claimed is:

1. A method of stabilizing a vibrating image, the method comprising:
   positioning nine fixed observation blocks at predetermined locations in a central region of an input video image;
   selecting one fixed observation block of the nine fixed observation blocks as a feature block by removing a featureless observation block and an observation block comprising a moving object from the nine fixed observation blocks and selecting a highest priority fixed observation block from remaining observation blocks of the nine fixed observation blocks as the feature block, wherein a gray level histogram is utilized for normalizing pixel value range of the fixed observation blocks from 0-255 to 0-25 and priority is assigned to the fixed observation block according to a highest pixel value of a highest pixel count level in the fixed observation block;
   utilizing block matching to find a motion vector of the feature block;
   utilizing the motion vector to restore an offset of the input video image caused by vibration; and
   displaying the restored input video image on a display;
   wherein when selecting the one fixed observation block of the nine fixed observation blocks as the feature block for calculating the motion vector, a remaining eight blocks of the nine fixed observation blocks continue to be updated by later input video images, and if a moving object entering the feature block is detected, a second fixed observation block of the remaining eight blocks is selected as a new feature block.

2. The method of claim 1, wherein positioning the nine fixed observation blocks of the input video image comprises:
   setting 20 pixels inward from each side of the input video frame as a compensation region;
   setting 20 pixels inward from each side of the compensation region as a search protection region; and
   positioning the nine fixed observation blocks in a remaining region formed after reducing the input video image by the compensation region and the search protection region;
   wherein the nine fixed observation blocks are positioned according to a principle that no fixed observation block of the nine fixed observation blocks has another fixed observation block of the nine fixed observation blocks in a horizontal direction and a vertical direction.

3. The method of claim 1, wherein removing the featureless observation block comprises utilizing gray level histogram analysis to remove the featureless block.

4. The method of claim 1, wherein removing the observation block comprising the moving object comprises determining a fixed observation block is the observation block comprising the moving object according to difference between two fixed observation blocks at a same position in two consecutive input video frames.

5. The method of claim 1, wherein utilizing block matching is utilizing mean absolute difference (MAD) as a comparison method for finding the motion vector of the feature block.

6. The method of claim 1, wherein selecting the second fixed observation block from the eight fixed observation blocks as the new feature block is selecting a fixed observation block having greatest priority as the new feature block.

7. A method of stabilizing a vibrating frame, the method comprising:
   utilizing frame differencing to difference N pixel values at N corresponding same positions in two neighboring frames to obtain N differences;

comparing each difference of the N differences to a first threshold to obtain a number of differences greater than the first threshold;

determining the two neighboring frames as having vibration when the number of differences greater than the first threshold is greater than a second threshold;

positioning nine fixed observation blocks at predetermined locations in a central region of an input video frame when the two neighboring frames are determined to have vibration;

selecting one fixed observation block of the nine fixed observation blocks as a feature block by removing a featureless observation block and an observation block comprising a moving object from the nine fixed observation blocks and selecting a highest priority fixed observation block from remaining observation blocks of the nine fixed observation blocks as the feature block, wherein a gray level histogram is utilized for normalizing pixel value range of the fixed observation blocks from 0-255 to 0-25 and priority is assigned to the fixed observation block according to a highest pixel value of a highest pixel count level in the fixed observation block;

utilizing block matching to find a motion vector of the feature block;

utilizing the motion vector to restore offset of the input video frame caused by vibration to generate a restored video frame; and outputting the restored video frame to a display;

wherein when the feature block of the nine fixed observation blocks is selected for calculating the motion vector, the eight remaining fixed observation blocks of the nine fixed observation blocks continue to be updated according to inputted video frames, and one fixed observation block of the eight remaining fixed observation blocks is selected as a new feature block when encroachment of a moving object on the feature block is detected.

8. The method of claim 7, wherein positioning the nine fixed observation blocks of the input video frame comprises:

setting 20 pixels inward from each side of the input video frame as a compensation region;

setting 20 pixels inward from each side of the compensation region as a search protection region; and positioning the nine fixed observation blocks in a remaining area defined by subtracting the compensation region and the search protection region from the input video frame.

9. The method of claim 7, wherein removing the featureless observation block comprises utilizing gray level histogram analysis to remove the featureless block.

10. The method of claim 7, wherein removing the observation block comprising the moving object comprises determining a fixed observation block is the observation block comprising the moving object according to difference between two fixed observation blocks at a same position in two consecutive input video frames.

11. The method of claim 7, wherein utilizing block matching is utilizing mean absolute difference (MAD) as a comparison method for finding the motion vector of the feature block.

12. The method of claim 7, wherein selecting the second fixed observation block from the eight fixed observation blocks as the new feature block is selecting a fixed observation block having greatest priority as the new feature block.

13. A method of stabilizing a vibrating frame, the method comprising:

applying frame differencing on each two neighboring frames of M consecutive frames to obtain M−1 first numbers;

determining the M consecutive frames have vibration when number of the M−1 first numbers greater than a first threshold is greater than (M−1)*0.8;

positioning nine fixed observation blocks at predetermined locations in a central region of an input video frame when the M consecutive frames have vibration;

selecting one fixed observation block of the nine fixed observation blocks as a feature block by removing a featureless observation block and an observation block comprising a moving object from the nine fixed observation blocks and selecting a highest priority fixed observation block from remaining observation blocks of the nine fixed observation blocks as the feature block, wherein a gray level histogram is utilized for normalizing pixel value range of the fixed observation blocks from 0-255 to 0-25 and priority is assigned to the fixed observation block according to a highest pixel value of a highest pixel count level in the fixed observation block;

utilizing block matching to find a motion vector of the feature block;

utilizing the motion vector to restore an offset of the input video frame caused by vibration to generate a restored video frame; and outputting the restored video frame to a display;

wherein when the feature block of the nine fixed observation blocks is selected for calculating the motion vector, the eight remaining fixed observation blocks of the nine fixed observation blocks continue to be updated according to inputted video frames, and one fixed observation block of the eight remaining fixed observation blocks is selected as a new feature block when encroachment of a moving object on the feature block is detected.

14. The method of claim 13, wherein applying frame differencing on each two neighboring frames of the M consecutive frames to obtain the M−1 first numbers comprises:

utilizing frame differencing to difference N pixel values at N corresponding same positions in two neighboring frames to obtain N differences;

comparing each difference of the N differences to a second threshold to obtain a number of differences greater than the second threshold;

determining the two neighboring frames as having vibration when the number of differences greater than the second threshold is greater than a third threshold.

15. The method of claim 13, wherein positioning the nine fixed observation blocks of the input video frame comprises:

setting 20 pixels inward from each side of the input video frame as a compensation region;

setting 20 pixels inward from each side of the compensation region as a search protection region; and positioning the nine fixed observation blocks in a remaining area defined by subtracting the compensation region and the search protection region from the input video frame;

wherein the nine fixed observation blocks are positioned according to a principle that no fixed observation block of the nine fixed observation blocks has another fixed observation block of the nine fixed observation blocks in a horizontal direction and a vertical direction.

16. The method of claim 13, wherein removing the featureless observation block comprises utilizing gray level histogram analysis to remove the featureless block.

17. The method of claim 13, wherein removing the observation block comprising the moving object comprises determining a fixed observation block is the observation block comprising the moving object according to difference between two fixed observation blocks at a same position in two consecutive input video frames.

18. The method of claim 3, wherein utilizing block matching is utilizing mean absolute difference (MAD) as a comparison method for finding the motion vector of the feature block.

19. The method of claim 13, wherein selecting the second fixed observation block from the eight fixed observation blocks as the new feature block is selecting a fixed observation block having greatest priority as the new feature block.

* * * * *